United States Patent
Carati et al.

(10) Patent No.: US 12,343,710 B2
(45) Date of Patent: Jul. 1, 2025

(54) HYDROTREATMENT CATALYSTS AND PROCESS FOR PREPARING SAID CATALYSTS

(71) Applicant: ENI S.p.A., Rome (IT)

(72) Inventors: Angela Carati, San Giuliano Milanese (IT); Giuseppe Bellussi, Piacenza (IT); Michela Bellettato, San Donato Milanese (IT)

(73) Assignee: ENI S.p.A., Rome (IT)

( * ) Notice: Subject to any disclaimer, the term of this patent is extended or adjusted under 35 U.S.C. 154(b) by 0 days.

(21) Appl. No.: 18/495,151

(22) Filed: Oct. 26, 2023

(65) Prior Publication Data

US 2024/0050929 A1  Feb. 15, 2024

Related U.S. Application Data

(62) Division of application No. 17/666,030, filed on Feb. 7, 2022, now Pat. No. 11,878,289, which is a division of application No. 16/317,978, filed as application No. PCT/IB2017/054439 on Jul. 21, 2017, now Pat. No. 11,311,862.

(30) Foreign Application Priority Data

Jul. 22, 2016  (IT) .................... 102016000077340

(51) Int. Cl.

| | |
|---|---|
| B01J 37/04 | (2006.01) |
| B01J 21/18 | (2006.01) |
| B01J 27/051 | (2006.01) |
| B01J 37/00 | (2006.01) |
| B01J 37/03 | (2006.01) |
| B01J 37/08 | (2006.01) |
| B01J 37/20 | (2006.01) |
| C01G 53/40 | (2025.01) |
| C10G 45/08 | (2006.01) |

(52) U.S. Cl.
CPC .......... B01J 27/0515 (2013.01); B01J 21/18 (2013.01); B01J 37/0009 (2013.01); B01J 37/031 (2013.01); B01J 37/04 (2013.01); B01J 37/084 (2013.01); B01J 37/088 (2013.01); B01J 37/20 (2013.01); C01G 53/40 (2013.01); C10G 45/08 (2013.01); C01P 2002/50 (2013.01); C10G 2300/1059 (2013.01); C10G 2300/202 (2013.01)

(58) Field of Classification Search
CPC ...... B01J 27/0515; B01J 37/037; B01J 37/04; B01J 37/084; B01J 37/088; B01J 37/20
See application file for complete search history.

(56) References Cited

U.S. PATENT DOCUMENTS

| | | |
|---|---|---|
| 2010/0279856 A1 | 11/2010 | Dykstra et al. |
| 2014/0323291 A1 | 10/2014 | Carati et al. |
| 2017/0136446 A1 | 5/2017 | Carati et al. |

FOREIGN PATENT DOCUMENTS

| | | | |
|---|---|---|---|
| CN | 103492066 A | 1/2014 | |
| RU | 2 334 554 C2 | 9/2008 | |
| RU | 2 554 941 C2 | 7/2015 | |
| SA | 519400882 | 2/2023 | |
| WO | WO-2012130728 A1 * | 10/2012 | ............ B01J 23/002 |

OTHER PUBLICATIONS

International Search Report and Written Opinion issued Nov. 28, 2017 in PCT/IB2017/054439, 15 pages.

Li, X.-G., et al., "Thermal decomposition of cellulose ethers", Journal of Applied Polymer Science, vol. 73 No. 14, XP055383497, Jul. 21, 1999, pp. 2927-2936.

Chen, Y., et al., "A new multi-metallic bulk catalyst with high hydrodesulfurization activity of 4,6-DMDBT prepared using layered hydroxide salts as structural templates", Applied Catalysis A: General, vol. 474, XP028845452, Sep. 2014, pp. 69-77.

Combine Russian Federation Office Action and Search Report issued Apr. 2, 2020 in Patent Application No. 2019103459/04(006351) (with English translation), 17 pages.

Combined Chinese Office Action and Search Report issued Feb. 9, 2021 in Chinese Patent Application No. 201780044089.3 (with English translation), 31 pages.

Li Zhongzheng, et al., "Chemistry of Plant Fiber Resources" China Light Industry Press, Jun. 30, 2012, 21 pages.

Second Office Action issued Nov. 2, 2023, in Saudi Arabian Patent Application No. 522441860 (with English-language Translation Summary).

\* cited by examiner

*Primary Examiner* — Randy Boyer
(74) *Attorney, Agent, or Firm* — Oblon, McClelland, Maier & Neustadt, L.L.P.

(57) ABSTRACT

A process may prepare catalysts advantageously usable in the hydrotreatment processes, for example in hydrodesulfurization, hydrodenitrogenation, hydrodearomatization processes of hydrocarbons. Such catalysts may include mixed oxides of nickel, aluminum, molybdenum, and tungsten and optionally a transition metal Me selected from Zn, Mn, Cd, and a mixture thereof, an organic component C, and possibly an inorganic binder B. The mixed oxides may include an amorphous phase and a pseudo-crystalline phase isostructural to wolframite.

20 Claims, 3 Drawing Sheets

HYDROTREATMENT CATALYSTS AND PROCESS FOR PREPARING SAID CATALYSTS

This application is a divisional application of U.S. application Ser. No. 17/666,030 filed Feb. 7, 2022, now U.S. Pat. No. 11,878,289, which was a divisional application of U.S. application Ser. No. 16/317,978, now U.S. Pat. No. 11,311,862, which was a national stage entry of PCT/IB2017/054439 filed Jul. 21, 2017, and claims the benefit of IT 102016000077340 filed Jul. 22, 2016.

The present invention is in the field of heterogeneous catalysis. Particularly, the present invention relates to a process for preparing catalysts advantageously usable in the hydrotreatment processes, for example in hydrodesulphurization, hydrodenitrogenation, hydrodearomatization processes of hydrocarbons.

In particular, the present invention relates to a process for obtaining said catalysts, which comprise mixed oxides of Nickel, Aluminum, Molybdenum and Tungsten and optionally a transition metal Me selected from the group consisting of Zn, Mn, Cd, and a mixture thereof, an organic component C, and possibly an inorganic binder B.

Said mixed oxides comprise an amorphous phase and a pseudo-crystalline phase isostructural to Wolframite.

The present invention further relates to said hydrotreatment catalysts and a hydrotreatment process wherein said catalysts are used.

Many conversion processes of crude oils heavy fractions into useful fuels and chemical compounds involve the use of catalysts. In particular, transition metal-based catalytic compositions showed to be effective in the refining process in which carrying out hydrotreatment unit operations.

Important developments of this sector were stimulated from the environmental regulations relating to the content of sulfur- and nitrogen-based pollutants in the fuels, which require specific treatments of crude oil fractions in order to reduce the content of such contaminants. Typically, such treatments are carried out by hydrogenation in the presence of Mo- or W-based supported catalysts, to which Co or Ni are added, as promoters of the activity of the same catalysts. The promoter synergistically acts with the base metal and allows to obtain an increase of the catalytic activity, in relation to the method of preparation, the type of material and other factors, (C. Giavarini, "Hydrotreating", in *Encyclopaedia of Hydrocarbons* Treccani, (2005), vol. 2, section 3.1, p. 115-135). So that the catalytic activity is showed, it is important to note that metals must be in the form of sulphides in the above-said compositions.

The tightening of the environmental regulations and the simultaneous worsening of fuels quality of crude oils made necessary to find new catalysts suitable for the boosted desulphurization of crude oil fractions, with particular reference to those compounds which are refractory to the treatment, such as for example, substituted dibenzothiophenes (DBT), wherein the attack to the Sulphur is sterically impeded. Furthermore, there is the need to obtain hydrodesulphurization catalysts capable of performing their function also in the presence of nitrogenous contaminants, which shows, also when present in limited amounts, a strong tendency to deactivate the function of the catalysts themselves, with adverse effects on the end-product quality.

The so-called bulk catalysts showed to be particularly effective for the this aim, said catalysts being described, for example, by M.V. Landau, D. Berger and M. Herskowitz in *J. Catalysis* (1996), vol. 159, p. 236-245.

The "bulk" catalysts used in the hydrotreatment processes can be formed exclusively by one or more non-noble metals of Group VIII and possibly one or more metals of Group VIB and they do not comprise "carrier" supports or substrates Typically, the bulk catalysts do not provide the presence of a binder in the final catalytic composition; when the use of the binder is necessary, the latter promotes the aggregation of bulk catalyst particles, preferably without modifying their morphology.

This type of catalysts and the preparation thereof are described, for example, in the patents U.S. 4,596,785, U.S. 4,820,677, U.S. 6,299,760, U.S. 6,635,599 and in the patent applications US 2007/0286781 and EP 1941944 A1.

U.S. 4,596,785 and U.S. 4,820,677 discloses catalysts for the hydrotreatment and/or hydro-refining of petroleum cuts, prepared by the co-precipitation of metals constituting said cuts, starting from water-soluble salts, in the presence of sulphides. Such methods involve to operate with sophisticated techniques and under inert atmosphere in order to avoid metal sulfurs to be subsequently transformed in the corresponding oxides. In the case of U.S. 4,596,785, the obtained catalyst has a crystalline structure which is similar to molybdenite as for the metal sulphide of Group VIB and a crystalline structures which is similar to pyrite as for the metal sulphide of Group VIII. Instead, the catalyst described in U.S. 4,820,677 is amorphous.

U.S. 6,299,760 and U.S. 6,635,599 discloses hydrotreatment bulk catalysts prepared by combining metal components in solution and their reaction to obtain a stable precipitate in the presence of oxygen, which is then sulphidated.

Particularly, certain modes through which it is possible to obtain said precipitate are listed in U.S. 6,635,599: for example by modifying the temperature and/or pH during or after the combination of metal components solutions, or by suitable addition of complexing agents or non-solvents, or still reducing the solvent amount or by adding an excess of one of the metal components up to cause its precipitation.

Also the application US 2007/0286781 discloses a processes for preparing multi-metal materials based on transition metals using co-precipitation techniques.

Finally, the patent application EP 1941944 A1 discloses catalysts for the hydrotreatment of petroleum fractions obtained by metals co-precipitation starting from solution of the corresponding ammonium salts, followed by high-temperature heating under inert atmosphere and a sulphiding treatment.

The inorganic binders can be comprised in the bulk catalyst compositions, such as for example silica, alumina, silica-alumina, in order to maintain the integrity of catalyst particles.

For example, in a preferred aspect of EP 1171549 B1, the addition of an inorganic binder during the catalyst preparation is provided, or, in a further preferred aspect, the above-mentioned inorganic binder is added to the catalytic composition before the step of formation of the catalyst. In particular, in EP 1171549 B1 it is pointed out that, when the binder is added as soluble precursor during the preparation process, it is to be ensured that it is converted to the solid state as such, namely without reacting with the other metal components. Generally, such binders have lower catalytic activity (or no catalytic activity) with respect to the bulk catalyst. Accordingly, the addition of an inorganic binder generally causes the reduction of the activity of the catalytic composition which comprises the same.

In other cases, the bulk catalyst compositions can comprise metals in the form of oxides so-called "refractory", such as for example, silica, alumina, magnesia, titania, zirconia, boric anhydride, and zinc oxide. For example, the application WO 2004/073859 discloses the preparation of a bulk catalyst of formula $(X)_b(M)_c(Z)_d(O)_e$, where X is at least one non-noble metal of group VIII, M is at least one non-noble metal of group VIB, Z is one or more elements selected from aluminum, silicon, magnesium, titanium, zirconium, boron and zinc, O is oxygen, an index selected between b and c is equal to 1 whereas d, e, and the other index selected between b and c and different from 1 are a number higher than 0, so that the molar ratio b/c is comprised in the range 0.5:1-5:1, the molar ratio d/c is comprised in the range 0.2:1-50:1, and the molar ratio e/c is comprised in the range 3.7:1-108:1.

The catalytic composition described in said application is prepared by a process of controlled co-precipitation of the metal compounds together with the refractory oxide and an alkaline compounds (generally ammonia) in a protic liquid, thus providing complex of metal and refractory oxide, which is further subjected to heat treatment. In a preferred form of the invention, the above-mentioned catalytic composition can comprise small amounts of zinc in the form of refractory oxide (in the range between 1% and 3% by weight with respect to the total weight of the catalytic composition), to which a positive effect on the surface area of the catalytic composition itself is attributed.

The catalyst of WO 2004/073859 is defined to be "a low crystallinity" catalyst, as demonstrated by the X ray diffraction "pattern" from which none reflection, characterized by full width at half maximum (FWHM) lower than 2.5° of 2θ, is highlighted.

The applications WO 2009/058783 and WO 2010/126689 disclose the preparation of bulk catalysts comprising additional components selected within the Groups IIA, IIB or IVB, among which Zn.

WO 2009/058783 discloses a catalytic precursor containing Zn/Mo/W/maleate, which after sulphidation allows to obtain better hydrocracking yields with respect to Ni/Mo/W-based catalysts known in the art, even operating at lower temperatures, however being less active of these latter in the hydrodesulphurization reaction.

WO 2009/126689 discloses a catalytic precursor characterized by a "residual geometric volume shrinkage" lower than 12% after sulphidation at a temperature of at least 100° C. for at least 30 minutes and with a monomodal distribution of the pores in the macropore region.

A further development was reached through the so-called multi-metal "bulk layered" catalysts, having the composition $Ni_xZn_y$MoW wherein Ni and Zn are present in a variable molar ratio, as described by Y. Chen, L. Wang, Y. Zhang, T. Liu, X. Liu, Z. Jiang e C. Li in "A new multi-metallic bulk catalyst with high hydrodesulphurization activity of 4,6-DMDBT prepared using layered hydroxide salts as structural templates" (2014) *Applied Catalysis A: General, vol.* 474 p. 69-77 and in WO 2014/043993. Authors attributed the high activity of such catalysts to the high content of active metals and to the stratified structure, which is capable to display a higher number of active sites and thus promoting the interaction between active metal sulphides, wherein the synergism between Ni/Zn and Mo/W plays an important role.

U.S. Pat. No. 7,648,941 discloses a "bulk" catalyst comprising Ni and W oxides as main components. A second metal of Group VIB (in an amount lower than 10% with respect to the total moles of metals of Group VIB) and a metal of Group V (in an amount lower than 10% with respect to the total moles of metals of Group VIB) can be added in the synthesis process.

In this case the preparation of the catalytic composition comprises a heat treatment of the reaction mixture for a time suitably long to allow the total conversion of the starting material. The obtained catalyst is defined as "non-amorphous", wherein at least one crystalline phase is present, even if one or more disordered phase are also present in the catalyst. In this conditions, the catalyst shows a metastable hexagonal structure, which is characterized by a diffraction spectrum with a single reflection between about 60° and about 65° of the angle 2θ, and main reflections between about 32° and about 36° C. of 2θ and between about 50° and about 55° of 2θ whose full widths at half maximum (FWHM) are lower than 2.5° of 2θ. The authors, without being bound to any theory, associate a high catalytic activity to the above-mentioned metastable hexagonal phase. At higher temperatures, the hexagonal phase is transformed in a orthorhombic regular structure constituted by $NiWO_4$ isostructural to Wolframite, which can be identified by comparing in the "standard powder diffraction database": JCPDS-ICDD PDF card 15-0755 o 72-1189 o 72-480, where it is referred to as "nickel tungstate oxide". Therefore, U.S. Pat. No. 7,648,941 associates the possibility to obtain the phase isostructural to Wolframite to compositions wherein tungsten is at least 90% of the total moles of metals of Group VIB.

WO 2012/130728 discloses particular mixed oxides containing Ni, Mo, W, at least one element selected from Si, Al and mixtures thereof, and possibly containing an organic component deriving from compound containing carbon and nitrogen, characterized by the fact that they comprise an amorphous phase and a monoclinic crystalline phase isostructural to Wolframite, with a crystallinity degree higher than 0% and lower than 100%, preferably higher than or equal to 3% and lower than 100%. Such mixed oxides have the composition $Ni_aY_bZ_cO_d \cdot pC$, where Y is a mixture of Mo and W and the Mo/W ratio is higher than 0.1 and lower than 10. The formation of the crystalline phase occurs during the heat treatment and the choice of the temperature allows to modulate the mixed oxide crystallinity degree. In fact, mixed oxides containing an amorphous phase and a crystalline phase isostructural to Wolframite, wherein said oxides have a crystallinity degree higher than 0% and more than 70%, can be obtained under certain conditions, wherein the heat treatments are carried out at temperatures higher than or equal to 150° C. and lower than or equal to 500° C., preferably at temperature higher than or equal to 170° C. and lower than or equal to 500° C. Heat treatments at temperatures higher than 500° C. and lower than 900° C. allows to obtain a mixed oxide containing an amorphous phase and a crystalline phase isostructural to Wolframite, wherein said oxide has a crystallinity degree higher than 70% and lower than 100%.

Recently, the even more restrictive regulations on the control of waste gas emissions made necessary the use of even more active catalysts. For example, the current European regulation provides that the maximum standard of sulphur in the automotive diesel fuel is 10 mg/kg.

Furthermore, the recent regulation also imposes a reduction of the content of aromatic hydrocarbons, in particular polycyclic aromatic hydrocarbons (PAH). These latter are known carcinogenic agents and can be present in the fuel and can be formed by combustion and then entering in the waste gas composition. The PAH combustion can cause, in turn, the formation of benzene. The aromatic hydrocarbon content in the diesel fuel can condition the flame temperature, thus affecting NOx emissions, and it is directly related to the formation of particulate and combustion $CO_2$ emissions.

In view of such reasons, the Directive 2009/30/CE of 2009 requires a reduction of the maximum content of PAH in the automotive diesel up to 8% m/m.

Therefore it is apparent the need to always provide for new catalysts, even more reactive and effective in removing heteroatoms, in particular sulphur and nitrogen, as well as capable of reducing the standard of aromatic hydrocarbon in the crude oil fractions intended to be used as fuels.

The Applicant has faced the aim to find new processes for preparing precursors of the above said bulk catalysts, cheaper and in line with the current orientations of environmental protection with respect to the processes of the known art, by using less amounts of organic additives and/or metals, which are expensive and toxic, taking then advantage in terms of safety and costs.

A second aim consists of identifying bulk catalyst from precursors obtained through the new preparation process, characterized by high performances of hydrodesulphurization and hydrodenitrogenation, wherein the ability to promote the hydrocarbon hydrodearomatization is also improved.

The Applicant has now found a new process for preparing precursors of bulk catalyst usable in hydrotreatment processes of crude oil fractions, comprising multi-metal mixed oxides, which allows to achieve the above-mentioned aims and has numerous advantages with respect to the processes of the know art.

Particularly, a first improving aspect of this process relates to the fact that it requires less amounts of precious metals of Group VIB and Group VIII without the catalytic activity of the materials obtained through the above-mentioned process being affected, and accordingly it is characterized by lower costs with respect to the preparation process of known bulk catalysts.

A further improving aspect relates to the use of lowered of organic additives, with consequent less loss by weigh of precursors of the above-mentioned catalysts after calcination and then higher yield of the preparation process.

A further advantage is that the above-mentioned preparation process does not involve any solid/liquid separation steps and provides the obtainment of metal concentrated suspensions: that allows to avoid the formation of separation waters contaminated with toxic metals and reducing the energetic cost and thus contributing to increase the preparation process yields.

Starting from precursors comprising mixed oxides of transition metals obtained through the process of the present invention, it is possible to prepare new catalysts which advantageously show a marked selectively towards hydrodesulphurization reactions, hydrodenitrogenation, and in particular hydrodearomatization, thus minimizing the hydrocracking reactions.

Further features and advantages will be apparent through the following detailed description.

In order to better understand the features of the process object of the present invention, reference will be made to the drawing of the alleged figures, which merely have an illustrative but non-limiting purpose.

Figure 1:
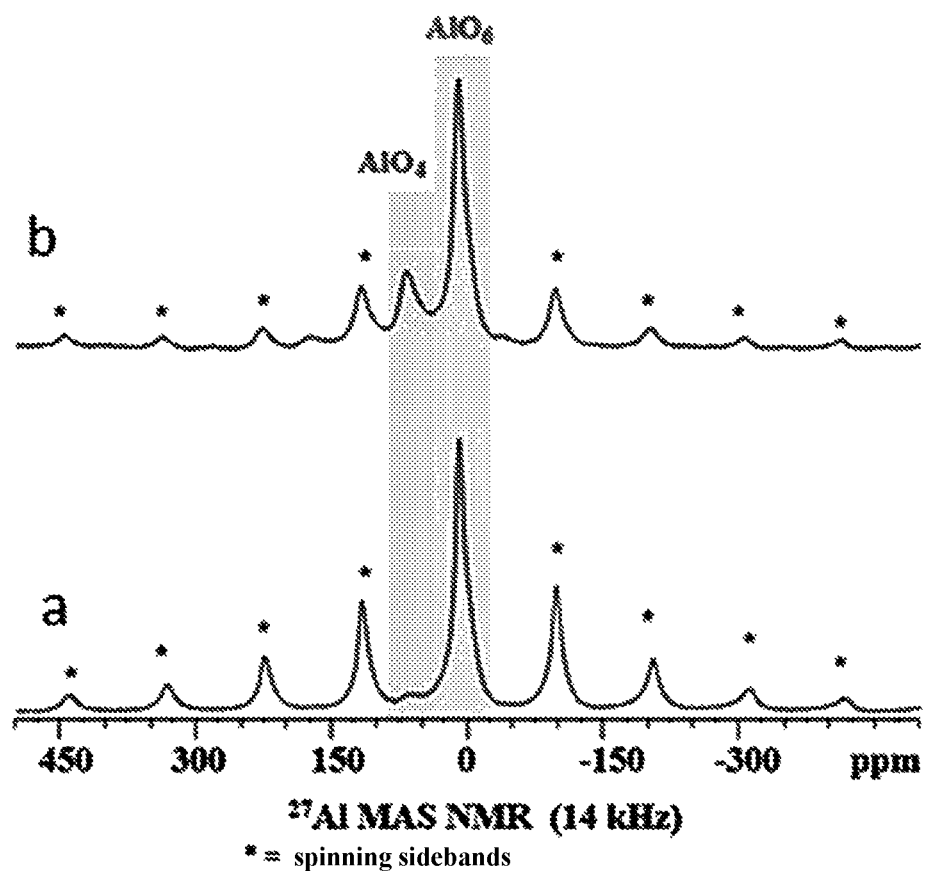
FIG. 1 shows the $^{27}$Al-MAS-NMR spectra of samples of mixed oxide of formula (I) (spectrum a) and of formula (I) bound with an Al-based inorganic binder B (spectrum b), prepared according to the process of the present invention and analyzed after calcination at a temperature comprised between 300 and 400° C.

For the aims of the present description and the following claims, the definition of the numerical ranges always comprises the end-points, unless otherwise specified.

In the description of the embodiments of the present invention, the use of the terms "comprising" and "containing" means that the options described, for example relating to the steps of a method or a process or the components of a product or a device, are not necessarily exhaustive. However, it is important to note that an object of the present invention are also the embodiments wherein the term "comprising" referred to the options described, for example such options relating to the steps of a method or a process or the components of a product or a device, is to be interpreted as "consisting essentially of" or "consisting of", even if not explicitly declared.

For the aims of the present description and the following claims, for the chemical elements and the belonging groups reference is to be made to the periodic table of elements reported in CRC Handbook of Chemistry and Physics (Ed. 58, 1977-1978) and using the CAS numbering. Particularly, for the aims of the present invention the expressions "Group VIB" and "metals of Group VIB" comprise chromium, molybdenum, tungsten, and mixtures thereof, in the elementary, ionic or compound form; the expressions "Group VIII" and "non-noble metals of Group VIII" comprise iron, cobalt, nickel, and mixtures thereof, in the elementary, ionic or compound form.

For the aims of the present invention, the term "bulk catalyst" means a non-supported catalyst, meaning in this way that the catalyst composition does not provide a preformed support on which metals are loaded by impregnation or deposition. Hereby the possibility that the compositions described and exemplified herein can comprise constituents different from those catalytically active, such as binders, promoters or additives, is not excluded.

For the aims of the present invention, the term "precursor of the crystalline phase isostructural to Wolframite" means a compound characterized in that it comprises an amorphous phase and a pseudo-crystalline phase isostructural to Wolframite which, when subjected to calcination under oxidizing atmosphere, at temperatures equal to or higher than 600° C. for a period of time higher than or equal to 3 hours, develops in a crystalline phase isostructural to Wolframite which has a xray diffraction "pattern" ("X-Ray Diffractometry", XRD) comprising the signals reported in Table 1.

TABLE 1

| No | 2θ (°) | Signal intensity |
|---|---|---|
| 1 | 15.6 ± 0.1 | Weak |
| 2 | 19.3 ± 0.2 | Strong |
| 3 | 24.0 ± 0.3 | Strong |
| 4 | 24.9 ± 0.3 | Strong |
| 5 | 30.9 ± 0.5 | Very strong |
| 6 | 31.5 ± 0.5 | Middle |
| 7 | 36.7 ± 0.5 | Strong |
| 8 | 37.2 ± 0.5 | Weak |
| 9 | 39.2 ± 0.5 | Middle |
| 10 | 41.7 ± 0.6 | Strong |
| 11 | 46.5 ± 0.6 | Weak |
| 12 | 48.1 ± 0.6 | Very weak |
| 13 | 49.1 ± 0.6 | Weak |
| 14 | 52.3 ± 0.7 | Middle |
| 15 | 54.7 ± 0.7 | Strong |
| 16 | 58.8 ± 0.7 | Very weak |
| 17 | 62.6 ± 0.7 | Middle |
| 18 | 63.7 ± 0.7 | Weak |
| 19 | 66.0 ± 0.8 | Strong |
| 20 | 68.9 ± 0.8 | Weak |

The term "crystalline phase isostructural to Wolframite" means a phase having the same type of crystalline structure of natural Wolframite (mineral constituted by tungstate mixed of iron and manganese), for example a class of prismatic monoclinic symmetry, but different chemical composition, wherein then W, Fe, Mn can be partially or wholly substituted by different metals. The above-mentioned phase has a XRD pattern comprising the signals reported in Table 1.

For the aim of the present invention, the term "hydrotreatment" means a set of reactions wherein a hydrocarbon charge is contacted with hydrogen to modify the main chemical and physical properties. It is important to remember that in the refining sector, the hydrotreatment can have different names as a function of purpose (for example, hydrodesulphurization, hydrodenitrogenation, hydrodearomatization, hydrodemetalation, hydrodeoxygenation, hydrodecyclization, hydroisomerization, hydrocracking, hydrodewaxing, etcetera). The generic term of hydrorefining is usually used, said term can comprise the same above-mentioned hydrotreatment processes and distinguishing from it, in general, only for the less severe, but not always, conditions.

The hydrotreatment according to present invention can be carried out on a wide variety of petroleum- and petrochemical-derivatives, which comprise whole or reduced crude oils, residues or products of atmospheric distillation or under-vacuum, residues of processes of deasphalting with propane, for example "brick stock" fractions, Heavy and Light Cycle Oils, residues of the Fluid Catalytic Cracking (FCC) process, gas-oils from atmospheric distillation and under-vacuum, gas-oils from coker, light and heavy distillate, comprised "raw virgin" distillates, hydrocracking products, dewaxing products, petrolatum, products of Fischer-Tropsch process, refined products, naphthas, products from EST process and mixtures thereof.

As products from the EST process it is to be intended hydrocarbon fractions obtained, for example, from the processes described in US 5,932,090, US 7,255,795, WO2004/058922, WO2004/056946, WO2004/056947, WO2005/047425, WO2006/066911, WO2006/066857, WO2008/014947, WO2008/014948, WO2008/141830, WO2008/141831, WO2008/151792, WO2009/003633, WO2009/003634, WO2009/149923.

Preferably, the hydrotreatment relates to hydrocarbon cuts containing sulphur derivative contaminants and/or nitrogen derivative contaminants, in particular containing up to 40000 ppm of sulphur, possibly containing up to 2000 ppm of nitrogen. In said cuts up to 60% by weight of aromatic hydrocarbons can be present and up to 30% by weight of polycyclic aromatic hydrocarbons.

In a first aspect, it is an object of the present invention a process for obtaining a mixed oxide comprising Ni, Mo, W, Al, optionally at least one metal Me and an organic component C or a residue of said organic component C, having the following formula (I),

$$Me_a Ni_b Mo_c W_d Al_e O_f / pC \qquad (I),$$

wherein:
Me is selected from the group consisting of Zn, Cd, Mn, and a mixture thereof,
C comprises a polymer organic compound,
a can be higher than or equal to 0,
b, c, d, e and f are higher than 0,
f is equal to $(2a+2b+6c+6d+3e)/2$,
the $(a+b)/(c+d)$ ratio is comprised between 0.9 and 1.1,
the a/b ratio is higher than or equal to 0 and lower than or equal to 1.5,
the c/d ratio is comprised between 0.2 and 5,
the $(a+b+c+d)/e$ ratio is comprised between 0.6 and 5, and
p is the weight percentage of C with respect to the total weight of the mixed oxide of formula (I), and is higher than 0% and lower than or equal to 40%, said mixed oxide of formula (I) comprising an amorphous phase and a pseudo-crystalline phase isostructural to Wolframite, wherein said process comprises the following steps:
1) mixing at least one soluble source of W and at least one soluble source of Mo into a suitable volume of water, until a clear aqueous solution is obtained;
2) optionally, adding at least one source of at least one element Me to the solution obtained in step 1;
3) adding at least one source of Ni to the mixture obtained in the previous step;
4) subjecting the mixture obtained in step 3 to a first heat treatment at temperatures comprised between 50° and 80° C., under stirring;
5) adding to the mixture obtained in step 4, at least one soluble, hydrolysable or dispersible source of Al, and at least one polymer organic compound;
6) subjecting the mixture obtained in the previous step to a second heat treatment at temperatures comprised between 80° C. and 95° C., under stirring, obtaining a suspension;
7) subjecting the suspension obtained in step 6 to drying, obtaining in such a way a solid phase;
8) calcining said solid phase obtained in the previous step, obtaining the mixed oxide of formula (I).

In a preferred aspect of the invention, b, c, d, and e are higher than 0.1.

In a preferred aspect of the invention, a is higher than 0 and more preferably a is higher than 0.1.

The process above described can be carried out sequentially from step 1 to step 8. However, in some preferred embodiments, at least one optional step can be omitted, or it is possible to add at least one additional step to said process, as better described in the following, without the object the invention to be modified.

The first step of the process consists of dissolving the tungsten source and the molybdenum source in an amount of water, preferably deionized or distilled water, at least sufficient to obtain a transparent solution.

Usable source of Mo and W are, for example, oxides, particularly acid oxides, the corresponding acids and ammonium salts thereof. Preferably, metatungstate is used as source of molybdenum ammonium and ammonium heptamolybdate is used as source of tungsten.

In the above-mentioned source of tungsten and molybdenum, the respective metals have a valence of 6.

The obtained mixture is maintained under stirring until a clear solution is obtained, indicating the total dissolution of Mo and W sources.

Preferably, step 1 of said process can be carried out at a temperature comprised between 25° C. and 50° C., in order to promote the above-mentioned dissolution.

According to optional step 2, a soluble or insoluble or partially soluble source of the element Me, preferably a soluble source, can be added to the obtained transparent solution.

Without wishing to be bound to any theory, the above mentioned element Me, when present, can have the function of promoting the formation of the pseudo-crystalline phase isostructural to Wolframite.

When the process comprises the addition of element Me, as already mentioned, said element can be selected from the group consisting of Zn, Cd and Mn, and a mixture thereof.

In a preferred aspect of the invention, the element Me optionally added to step 2 of said process can be Zn.

In a further preferred aspect of the invention, the element Me optionally added in step 2 can be Mn.

Usable sources of element Me can be, for example, the corresponding nitrates, acetates, carbonates, hydroxycarbonates.

When Me is Zn, zinc acetate or zinc hydroxycarbonate, preferably zinc acetate, can be used as sources of the element Me.

Preferably, when Me is Mn, manganese acetate can be used as a source of element Me.

In the above said source of the element Me, all the respective metals (Zn, Cd or Mn) have valence 2.

In a preferred aspect of the invention, the optional step 2 can be omitted. In this case, in the mixed oxide of formula (I) obtained at the end of the above-mentioned process, the element Me is not present, namely the "a" index of said element Me in the above-mentioned formula (I) is equal to 0.

Then, according to step 3 of the present process, a soluble, insoluble or partially soluble source, preferably a partially soluble source, of nickel is added. Usable sources of Ni can be the correspondent nitrates, acetates, hydroxycarbonates, carbonates, acetylacetonates. Preferably, nickel hydroxycarbonate can be used.

Preferably, step 3 of said process can be carried out at a temperature comprised between 50° C. and 70° C., in order to promote the dissolution of said Ni source in the mixture obtained in the previous step.

The mixture obtained is subjected in step 4 to a first heat treatment, at temperatures comprised between 50° C. and 80° C., under stirring.

Preferably, said first heat treatment of step 4 can be carried out for a time comprised between 10 minutes and 1 hour, at temperatures comprised between 50° C. and 80° C., under stirring.

In a preferred aspect, said first heat treatment of step 4 of the present preparation process can be carried out at temperatures comprised between 55° C. and 70° C., maintaining the mixture constantly under stirring.

In a preferred aspect, the first heat treatment of step 4 of said processes can be carried out under constant stirring for a time comprised between 20 and 40 minutes.

In a particularly preferred aspect of the present invention, the first heat treatment of step 4 of said process can be carried out at a temperature comprised between 55 and 70° C. for a time comprised between 20 and 40 minutes, under constant stirring.

At the end of this heat treatment step, the process envisages that, in step 5, the at least one soluble source of aluminum, hydrolysable or dispersible, and at least one polymer organic compound, can be added to the mixture thus obtained.

As aluminum sources, for example, aluminum lactate, or dispersible alumina, or alumina monohydrate, or alumina trihydrate, or aluminum trialkoxides, wherein the alkyl is linear or branched and can contain from 2 to 5 carbon atoms, can be used and preferably a dispersible alumina is used.

Preferably, the dispersible alumina, added as aluminum source in step 5 of said process, can be a boehmite or pseudo-boehmite characterized by particles having an average diameter lower than 100 µm. Usable dispersible aluminas can be, for example, bohemites commercially available of the series Versal®, Pural®, Catapal®, Dequadis®, Disperal® and Dispal®.

Among the dispersible aluminum sources, water-dispersible aluminas or aluminas dispersible in aqueous solutions containing a monovalent acid, at room temperature, under stirring, can be particularly preferred: this aluminas are nanodimensional in the dispersed phase, characterized by particles sizes in dispersion comprised between 10 and 500 nm. Dispersible aluminas of this type which are advantageously usable are, for example, commercially available boehmites of the series Disperal P3® ($Al_2O_3$ 68% by weight) and Dequadis HP®.

Preferably, the sources of hydrolysable aluminum which, starting from aluminum monomeric precursors, guarantee its good dispersion, can be trialkylaluminates wherein the alkyl group contains from 3 to 4 carbon atoms.

It is important to note that the γ-aluminas are not comprised among the aluminum source usable in this step.

In a preferred aspect of the invention, the source of Al can be added to step 5 as dispersion previously prepared in the following manner: a soluble source of Al, hydrolysable or dispersible, in an amount comprised between 5 and 25% by weight, preferably between 8 and 18% by weight, is added to an aqueous solution containing between 0.2 and 2% by weight of acetic acid. The obtained dispersions is stirred for a time comprised between 1 and 48 hours, preferably between 3 e 24 hours, at a temperature comprised between 25 and 90° C., preferably between 30 and 70° C.

Then, in order to promote the homogeneity of the composition and improve the textural properties of the final mixed oxide, a polymer organic compound is added to the obtained dispersion after the addition of the Al source, The above-mentioned polymer organic compound added in step 5 of said process preferably comprises one or more heteroatoms selected from N and O and can be selected, for example, from the group consisting of ammonium alginate, methylcellulose, propyl methylcellulose, ethylene glycol and propylene glycol copolymers, octylphenol ethoxylated, polioxyethylene cetyl ether.

In a preferred aspect, the polymer organic compound added to step 5 of said process is methylcellulose. In such a case, a commercially available methylcellulose can be used, such as, for example, methylcellulose Fluka® (viscosity of a suspension 2% in water=1200-1800 cP), methylcellulose Acros® (viscosity of a suspension 2% in water=15 cP), propyl methylcellulose Dow® Methocel® 311 (viscosity of a suspension 2% in water>1000 cP).

In a further preferred aspect of the present invention, the polymer organic compound added in step 5 of said process can be ammonium alginate.

In other preferred forms of the present invention, a polyethylenglycol-polypropylenglycol-polyethylenglycol block copolymer, (for example, the polymer commercially available as Pluronic® P123 with a viscosity at 60° C.=350 cP), or octylphenol ethoxylated (commercially available as Triton® X-305, with properties of non-ionic surfactant, characterized by a viscosity at 25° C.=470 cP), or polyoxyethylene cetyl ether (commercially available as Brij® 58, with properties of non-ionic surfactant, characterized by a relative viscosity ($H_2O$=1) 5% in water at 25° C.=1.2-1.5), can be used as polymer organic compound.

Said polymer organic compounds can be added in a percentage variable between 1% and 10% by weight with respect to the weight of metals present in the mixture.

In a preferred aspect, said polymer organic compound can be added in a percentage comprised between 1% and 5% by weight with respect to the weight of the metals.

Therefore it is apparent that the amount of polymer organic compound in the process of preparation of the catalyst according to the invention is particularly lowered: this allows that during the following mixed oxide calcination, smaller amounts of volatile organic compounds are produced, in particular nitrogenous compounds, so as to not necessarily require the treatment of emitted vapors into post-combustion chambers.

According to an alternative embodiment of the present invention, in step 5 the above-mentioned process, instead of separately adding at least one soluble, hydrolysable or dispersible source of Al and then at least one polymer organic compound, a dispersion, prepared separately and comprising both said at least one soluble, hydrolysable or dispersible source of Al and said at least one polymer organic compound, can be added.

In order to prepare the above-mentioned dispersion comprising both Al and the polymer organic compound, the procedure is the following: a soluble, hydrolysable or dispersible source of Al is added to an aqueous solution containing acetic acid and the obtained dispersion mixed with an aqueous suspension comprising a polymer organic compound and previously maintained under stirring for a period comprised between 20 minutes and 1 hour at a temperature comprised between 25 and 80° C.

Also in this case, the polymer organic compounds can be added in a percentage variable between 1% and 10% by weight with respect to the weight of metals present in the mixture.

In a preferred aspect, said polymer organic compound can be added in a percentage comprised between 1% and 5% by weight with respect to the weight of the metals.

After the addition of the polymer organic compound, the dispersion comprising both the soluble, hydrolysable or dispersible source of Al and the polymer organic compound, is stirred for a time comprised between 1 and 48 h, preferably between 3 and 24 h, and at a temperature comprised between 25 and 90° C., preferably between 30 and 70° C. before to be added to the metal-containing mixture obtained in step 3 of the process according to the invention.

Both by adding the Al source separately from the polymer organic compound, and by adding these two components together, as above described, the obtained mixture, comprising Mo, W, Ni, Al, the polymer organic compound, and optionally Me, is further subjected in subsequent step 6, to a second heat treatment at temperatures comprised between 80° C. and 95° C., under stirring.

Preferably, said second heat treatment is carried out at temperatures comprised between 80° C. and 95° C. for a time comprised between 5 and 30 hours, under stirring.

This second heat treatment allows to obtain an homogeneous suspension, wherein the metal components possibly deriving from non-soluble or partially soluble sources can interact and establish a close contact with each other. Preferably, the suspension obtained in step 6 can have a theoretical content of metal oxides comprised between 15 and 40% by weight, preferably between 18 and 30% by weight with respect to the total weight of the suspension.

In a preferred aspect of the invention, said second heat treatment can be carried out at temperatures comprised between 85° C. and 92° C.

In a preferred aspect of the invention, said second heat treatment can be carried out for a time comprised between 15 and 25 hours.

In a particularly preferred aspect of the invention, said second heat treatment of step 6 can be carried out at temperatures comprised between 85° C. and 92° C. for a time comprised between 15 and 25 hours.

The suspension thus obtained is subjected to a step 7 of drying. The main function of the drying of step 7 is to remove the water present in the suspension, thus allowing to obtain a solid phase.

The drying of step 7 can be carried out by using any of the techniques known to one skilled in the art, for example, static oven, or by "belt drying" or "flash drying" or "spray drying" and preferably it is carried out by "spray drying".

In a preferred aspect, the drying can be carried out at a temperature comprised between 100° C. and 250° C.

The time necessary to prevent a solid phase is related to the method used to carry out the drying operation of step 7. Identifying the more suitable time for each method use, in order to obtain the desired solid phase, is within the abilities of the skilled person.

It is important to note that step 6, in which the second heat treatment is carried out, is distinct from step 7 of drying, even if the two steps can be carried out possibly through the same principle, namely by heat administration for a suitable time, in view of the fact that, unlike step 6, from which it is possible to obtain a suspension, even extremely dense, in the drying step 7 is essential to obtain a solid phase substantially free of liquid phase.

In a preferred aspect of the invention, after drying, the obtained solid phase can be subjecting to shaping.

In this case, the process according to the present invention can comprise an additional step 7' immediately subsequent to step 7, wherein the dried solid phase obtained in said step 7 is subjecting to shaping.

All the shaping techniques can be used for this purpose. The shaping can be carried out by tableting, extrusion, granulation, spherulization or atomization by spray-drying.

In order to facilitate the shaping operations, it is possible to add one or more organic additives to the mixed oxide in order to improve the rheology properties of the above-mentioned mixed oxide. These additives preferably can comprise: starch, cellulose, stearate, surfactant agents, or a mixture thereof.

The last step of the process provides the partial calcination of the mixed oxide prepared. The calcination of step 8 can be carried out under air or inert atmosphere, at temperatures higher than or equal to 200° C. and lower than or equal to 450° C. In a preferred aspect, the calcination can be carried out at temperatures comprised between 300° C. and 400° C.

The partial calcination can be carried out at a constant temperature or under a temperature gradient (or "programming"). The calcination time can vary preferably from a minimum of 3 hours up to 20 hours. Based on the calcination temperature and calcination time, the mixed oxide obtained can contain variable percentages, higher than 0 and lower than or equal to 40%, of the organic component C and/or of a residue of said organic component C.

For the aims of the present invention, the term "residue of the organic component C" means the set of the compounds, not better characterized, possibly present and deriving from said organic component C by thermal decomposition or degradation during the calcination process.

The above-mentioned organic component C can comprise, in addition to the polymer organic compound previously described, an organic portion deriving from the metal sources (for example acetate ion, acetylacetonate ion, lactate ion, alkoxide) and acetic acid, possibly used in the preparation process of the mixed oxide according to the invention.

The organic component C (and possibly the above-mentioned residue of the organic component C) can be quantitatively measured by thermogravimetry and differential thermal analysis (TG-DTA) on a sample of mixed oxide by using a Mettler thermobalance (mod. TG50). The test is carried out by subjecting the sample to a heating ramp of 10° C./min under air flux (200 cm³/min) from 30° C. to 600° C. The content of the organic component C (and possibly the above-mentioned residue of the organic component C), is expressed as percentage (percentage "p") by weight with respect to the total weight of the mixed oxide, and it is calculated depending on the loss of weight of the sample analyzed through TG-DTA in the range 150-600° C.

In a preferred aspect, after calcination, the percentage "p" of said organic component C and possibly of the residue of said organic component C, in the composition of the mixed oxide obtainable by the process of the present invention, can be higher than or equal to 0.01% and lower than or equal to 30%.

In a preferred aspect, "p" can be higher than or equal to 0.2% and lower than or equal to 10%.

In a preferred embodiment of the invention, the process according to the invention provides the introduction of the element Me, in step 2.

Therefore, according to a preferred embodiment of the present invention, the process for obtaining a mixed oxide comprising Ni, Mo, W, Al, at least one metal Me and an organic component C or a residue of said organic component C, having the following formula (I),

$$Me_aNi_bMo_cW_dAl_eO_f pC \qquad (I),$$

wherein:
Me is selected from the group consisting of Zn, Cd, Mn, and a mixture thereof,
C comprises a polymer organic compound,
a, b, c, d, e and f are higher than 0,
f is equal to $(2a+2b+6c+6d+3e)/2$,
the $(a+b)/(c+d)$ ratio can be comprised between 0.9 and 1.1,
the a/b ratio can be higher than or equal to 0 and lower than or equal to 1.5,
the c/d ratio can be comprised between 0.2 and 5,
the $(a+b+c+d)/e$ ratio can be comprised between 0.6 and 5, and
p is the weight percentage of C with respect to the total weight of the mixed oxide of formula (I), and can be higher than 0% and lower than or equal to 40%,
said mixed oxide of formula (I) comprising an amorphous phase and a pseudo-crystalline phase isostructural to Wolframite, comprises the following steps:
1) mixing at least one soluble source of W and at least one soluble source of Mo into a suitable volume of water, until obtaining a clear aqueous solution;
2) adding at least one source, preferably soluble, of at least one element Me to the solution obtained in step 1;
3) adding at least one source, preferably partially soluble, of Ni to the mixture obtained in the previous step;
4) subjecting the mixture obtained in step 3 to a first heat treatment at temperatures comprised between 50° and 80° C., under stirring;
5) adding to the mixture obtained in step 4, at least one soluble, hydrolysable or dispersible source of Al, and at least one polymer organic compound;
6) subjecting the mixture obtained in the previous step to a second heat treatment at temperatures comprised between 80° C. and 95° C., under stirring, obtaining a suspension;
7) subjecting the suspension obtained in step 6 to drying, obtaining in such a way a solid phase;
8) calcining said solid phase obtained in the previous step, obtaining the mixed oxide of formula (I).

In a preferred aspect, a, b, c, d and e can be higher than 0.1.

Preferably, the first heat treatment of step 4 can be carried out for a time comprised between 10 minutes and 1 hour, at temperatures comprised between 50° C. and 80° C., under stirring.

Preferably, the second heat treatment of step 6 can be carried out for a time comprised between 5 and 30 hours, at temperatures comprised between 80° C. and 95° C., under stirring.

On the contrary, according to an alternative embodiment, the process according to the invention can exclude the introduction of element Me in step 2.

In this case, the step 2 of the process can be omitted and the "a" index in formula (I) is equal to 0.

An advantage of the present process consists in that it does not involve separating and washing operations of the obtained solid phase. The absence of these steps allows the maintenance of the atomic ratios between the metals present in the mixtures reacting during the whole process in the final solid product: accordingly, it is not necessary the analytic control for determining the final composition of the mixed oxide metals, corresponding to the atomic ratios of the metals used during the process, even after the calcination.

Furthermore, in this way the production of waters contaminated with the mixed oxide metals is avoided. This aspect has particular industrial and environmental relevance as these metals are generally toxic and some of them are classified among the carcinogenic compounds.

In a further embodiment of the present invention, the above described process can be modified so as to provide the addition of at least one inorganic binder B.

The process for preparing the mixed oxides of formula (I) bound to at least one inorganic binder B comprises all the steps of the process already described and comprises one additional step 5', which is immediately after step 5 of said process, namely after the addition of the polymer organic compound, or, in the case where this latter is added in mixture with the aluminum source, after the addition of said mixture to the mixture obtained in step 4, wherein an inorganic binder B is added.

The above-mentioned inorganic binder B can be constituted by a material conventionally used as inorganic binder for catalysts. Non-limiting examples of inorganic binder can comprise, for example, silica, alumina, silico-alumina, silica coated with alumina and alumina coated with silica, gibbsite, titania, zirconia, anionic and cationic clays, saponite, bentonite, kaolin, sepiolite or hydrotalcite, or mixtures thereof. Preferred binding material are silica, alumina, silico-alumina or mixtures thereof. In particular, γ-alumina can be used as source of alumina, possibly in the form of aqueous dispersion.

When the mixed oxide of the present invention is bound with at least one inorganic binder B wherein B contains Al, two forms structurally different of said metal are detectable in the above-mentioned mixed oxide, to which different functions are associated (component of the catalytic composition and function of inorganic binder, respectively).

The presence of two aluminum forms structurally different in the mixed oxide described above was confirmed by comparing through solid-state spectroscopy $^{27}$Al MAS NMR, a mixed oxide of formula (I) and the corresponding mixed oxide bound to an Al-based inorganic binder B. An instrument Varian V-500, a pulse time of 0.2 µs (10° pulse) and a relaxing delay of 1 s were used for the test. The rotor of 4 mm containing the powder rotated at 14 kHz. The spectra were obtained at 130 MHz; the chemical shifts were referred to aluminum trichloride in solution (at 0 ppm). The $^{27}$Al-MAS-NMR spectra of the samples of mixed oxide of formula (I) without inorganic binder (spectrum a) and bound to an Al-based inorganic binder B (spectrum b), prepared according to the process of the present invention and analyzed after the calcination at a temperature comprised between 300 and 400° C., are reported in FIG. 1. Disregarding the "spinning side bands" (indicated by the asterisks in FIG. 1), it can be noted the presence of two different signals with a chemical shift equal to 6±5 and 64±5 ppm attributed to Al atoms, in an octahedral [AlO$_6$] and tetrahedral coordination [AlO$_4$], respectively. The relative abundance of the two species, expressed as mol %, was obtained through the process of signal deconvolution and calculation of the underlying area and is reported in Table 2.

As evident, the sample of mixed oxide of formula (I) has almost exclusively Al in an octahedral coordination, whereas the sample corresponding to the mixed oxide bound to the Al-based inorganic binder B, as well as the aluminum octahedral component, has a second Al component with an octahedral and tetrahedral coordination, compatible with the presence of γ-alumina as inorganic binder. The aluminum present as γ-alumina constitutes only a portion of the total aluminum present in the sample of mixed oxide bound to at least one inorganic binder B, according to a lower content of [AlO$_4$] mol %, with respect to a sample of γ-alumina.

TABLE 2

| Sample | [AlO$_6$] mol % | [AlO$_4$] mol % | Reference |
| --- | --- | --- | --- |
| Mixed oxide of formula (I) | 99 | 1 | — |
| Mixed oxide of formula (I) bound to an Al-based inorganic binder B | 81 | 19 | — |

TABLE 2-continued

| Sample | [AlO$_6$] mol % | [AlO$_4$] mol % | Reference |
| --- | --- | --- | --- |
| γ-alumina | 70 | 30 | M.-H. Lee, C.-F. Cheng, V. Heine and J. Klinowski, Chem. Phys. Lett. 265, 673-676 (1997) |

In a preferred aspect of the invention, also in the process of preparation of the mixed oxide of formula (I) bound to at least one inorganic binder B, a step of shaping after the drying of the obtained solid phase can be included.

Similarly to as described above, for this purpose the process according to the present invention can comprise a step 7' immediately subsequent to step 7 of drying in which the dried solid phase obtained in said step 7 is subjected to shaping.

Also the mixed oxide of formula (I) formed in the presence of at least one inorganic binder B, comprises an amorphous phase and a pseudo-crystalline phase isostructural to Wolframite.

The mixed oxide of formula (I) bound to at least one inorganic binder B of the present invention can be subjected to calcination, before the use, under air of inert atmosphere, at temperatures higher than 250° C. and lower than or equal to 450° C. and preferably can be subjected to calcination at temperatures comprised between 300° C. and 400° C.

The calcination can be carried out at constant temperature or under temperature gradient (or "programming"). The calcination time can vary from a minimum of 3 hours up to 20 hours. Based on the calcination temperature and calcination time, the calcinated mixed oxide can contain variable percentages, higher than 0 and lower than or equal to 40%, of the organic component C and/or of a residue of said organic component C.

It is a second object of the present invention a mixed oxide comprising Ni, Mo, W, Al, optionally at least one metal Me and an organic component C or a residue of said organic component C, having the following formula (I):

$$Me_aNi_bMo_cW_dAl_eO_f \cdot pC \qquad (I)$$

wherein:
Me is selected from the group consisting of Zn, Cd, Mn, and a mixture thereof,
C comprises a polymer organic compound,
a is higher than or equal to 0,
b, c, d, e and f are higher than 0,
f is equal to $(2a+2b+6c+6d+3e)/2$,
the (a+b)/(c+d) ratio is comprised between 0.9 and 1.1,
the a/b ratio is higher than or equal to 0 and lower than or equal to 1.5,
the c/d ratio is comprised between 0.2 and 5,
the (a+b+c+d)/e ratio is comprised between 0.6 and 5, and
p is the weight percentage of C with respect to the total weight of the mixed oxide of formula (I) and is higher than or equal to 0% and lower than or equal to 40%,
said mixed oxide comprising an amorphous phase and a pseudo-crystalline phase isostructural to Wolframite.

In a preferred aspect, a is higher than 0 and more preferably a is higher than 0.1.

In a preferred aspect, b, c, d and e are higher than 0.1.

In a preferred aspect of the invention, when a is higher than 0 the element Me can be Zn.

In a further aspect of the present invention, when a is higher than 0, the element Me can be Mn.

In a further aspect of the present invention, the (a+b)/(c+d) ratio can be comprised between 0.8 and 2. In a further preferred aspect said (a+b)/c+d) ratio can be equal to 1.

In a preferred aspect the a/b ratio can be higher than or equal to 0 and lower than or equal to 1. In a particularly preferred aspect the a/b ratio can be comprised between 0.1 and 0.4.

Preferably, the c/d ratio can be comprised between 0.4 and 3. In a particularly preferred aspect the c/d ratio can be comprised between 1 and 2.5.

Preferably, p can be higher than or equal to 0.01% and lower than or equal to 30%. In a further preferred aspect, p can be higher than or equal to 0.2% and lower than or equal to 10%.

In a preferred aspect, the mixed oxide of formula (I) can be obtained through the process of the present invention described above.

In a preferred aspect, said mixed oxide can be bound to at least one inorganic binder B.

In a preferred aspect, said mixed oxide of formula (I) bound to at least one inorganic binder B can be obtained through the process of the present invention, in the embodiment which envisages an additional step 5' wherein said inorganic binder B is added. As already mentioned previously, the above-mentioned step 5' is set after step 5 of said process, namely after the addition of the polymer organic compound, or, in case the latter is added in mixture with the aluminum source, after the addition of said mixture.

The mixed oxides of formula (I) obtained by the process according to the present invention, were characterized, before and after the calcination, by X ray diffractometry of the powders, by means of a Philips mod. X'Pert diffractometer with vertical goniometer equipped with a pulse-counting electronic system, by using the Cu Kα radiation (wavelength X=0.154 nm) applying methods known to one skilled in the art.

Figure 2A:
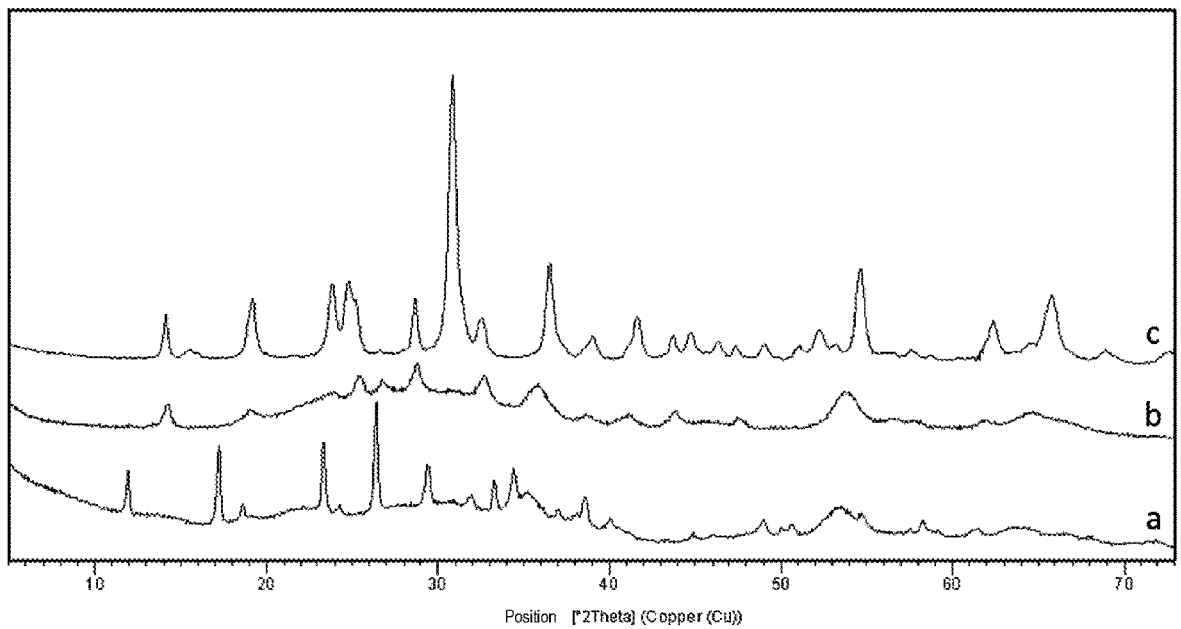
FIG. 2a the XRD spectra of a mixed oxide of formula (I) wherein the metal Me is absent (the index "a" is equal to 0) are reported and FIG. 2b, the XRD spectra of a mixed oxide of formula (I) wherein the metal Me is present and it is Zn are reported. In both cases, the spectra were obtained on samples analyzed after drying (spectrum a), after calcination at a temperature comprised between 300 and 400° C. (spectrum b) and after calcination at 600° C. (spectrum c) corresponding to the mixed oxide.
Figure 2B:
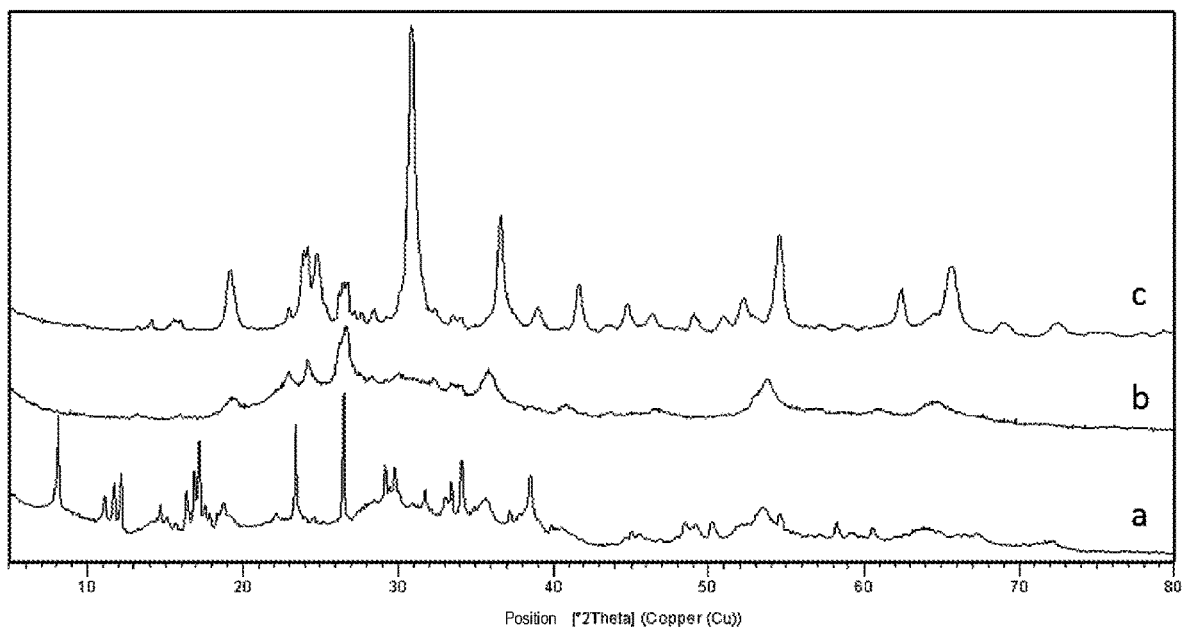

For example, in FIG. 2a the XRD spectra of a mixed oxide of formula (I) are reported, wherein the metal Me is absent (the "a" index is equal to 0) whereas in FIG. 2b the XRD spectra of a mixed oxide of formula (I) are reported, wherein the metal Me is present and it is Zn. In both cases, the spectra were obtained on samples analyzed after drying (spectrum a), after calcination at a temperature comprised between 300 and 400° C. (spectrum b) and after calcination at 600° C. (spectrum c) of the corresponding mixed oxide.

After the calcination at a temperature comprised between 300 and 400° C. (FIGS. 2a and 2b, spectrum b) the above-mentioned mixed oxides of formula (I) are characterized for the presence of an amorphous phase and of a pseudo-crystalline phase.

Through heat treatment at 600° C. the pseudo-crystalline phase evolves towards the formation of a crystalline phase isostructural to Wolframite. The pseudo-crystalline phase present in the samples after calcination at a temperature comprised between 300 and 400° C. is therefore a precursor of a crystalline phase isostructural to Wolframite. In the X ray diffraction spectrum of calcinated samples at 600° C. (FIGS. 2a and 2b, spectra c), the signals reported in Table 1 above are distinguished.

In particular, the mixed oxide comprising metal Me (FIG. 2b) is further characterized by at least two additional signals in the range comprised between 25° and 28° of the 2θ angle (at 26.2°, of very weak intensity and at 26.6°, of weak intensity).

In FIGS. 2a and 2b, spectra a, the X ray diffraction spectra of the samples highlight signals attributable to the mixed ammonium salts present. Therefore, the calcination treatment promotes the formation of the mixed oxides of formula (I), characterized by a crystalline phase isostructural to Wolframite, which is well crystalized after treatment at 600° C.

It is important to note that in the mixed oxide of formula (I) comprising the Me metal, in the x-rays diffraction spectrum at 120° C., 350-400° C. and 600° C. (FIG. 2b) are always present at least three signals in the range comprised between 25° and 28° of the 2θ angle.

The mixed oxide of formula (I) obtained through the process of the present invention, was further characterized by Fourier Transformed Infrared Spectroscopy (FT-IR), with a spectrometer Perkin-Elmer mod. Spectrum BX, using tablets of powders diluted in KBr (2% by weight in KBr), by applying methods known to one skilled in the art.

The FT-IR spectra obtained after drying (120° C.), after calcination at a temperature comprised between 300 and 400° C. (350° C.) and after complete calcination (600° C.) of a mixed oxide of formula (I) comprising the metal Me and where Me=Zn, obtained through the process according to the invention, are reported in FIG. 3a.

Figure 3A:
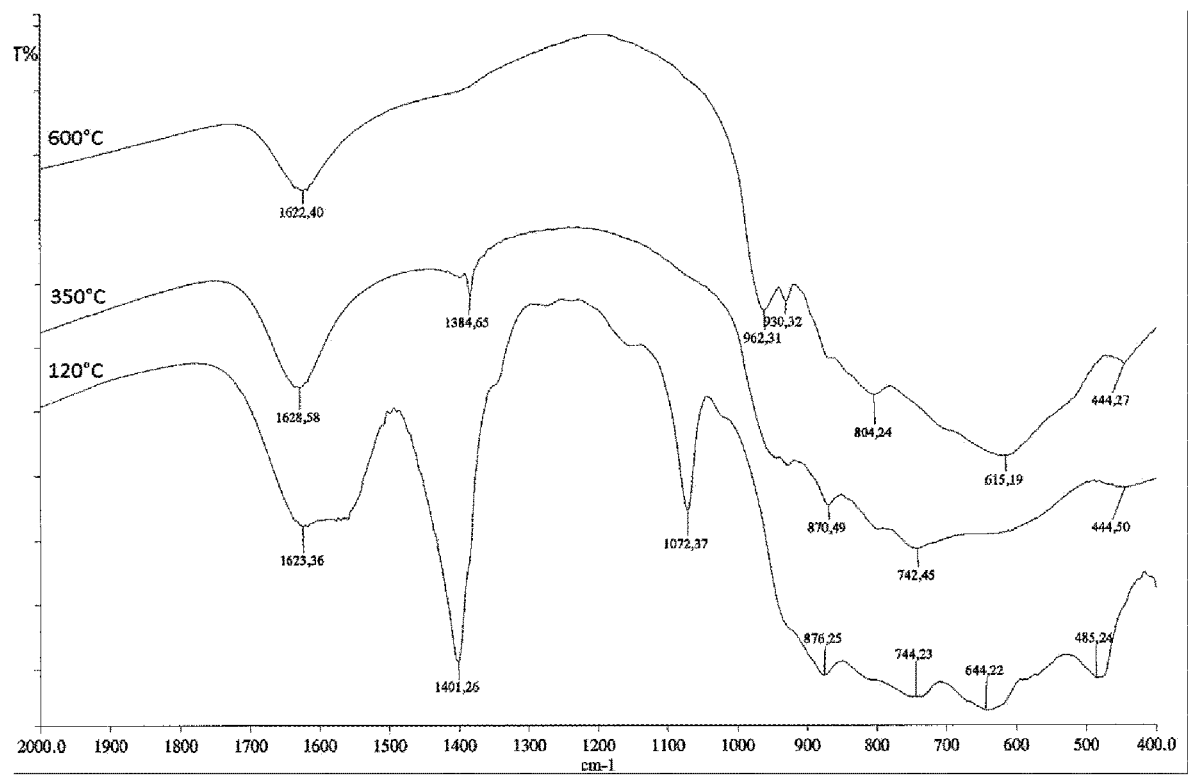
FIG. 3a shows FT-IR spectra obtained after drying (120° C.), after calcination at a temperature comprised between 300 and 400° C. (350° C.) and after complete calcination (600° C.) of a mixed oxide of formula (I) comprising the metal Me and wherein Me=Zn, obtained by the process according to the invention
Figure 3B:
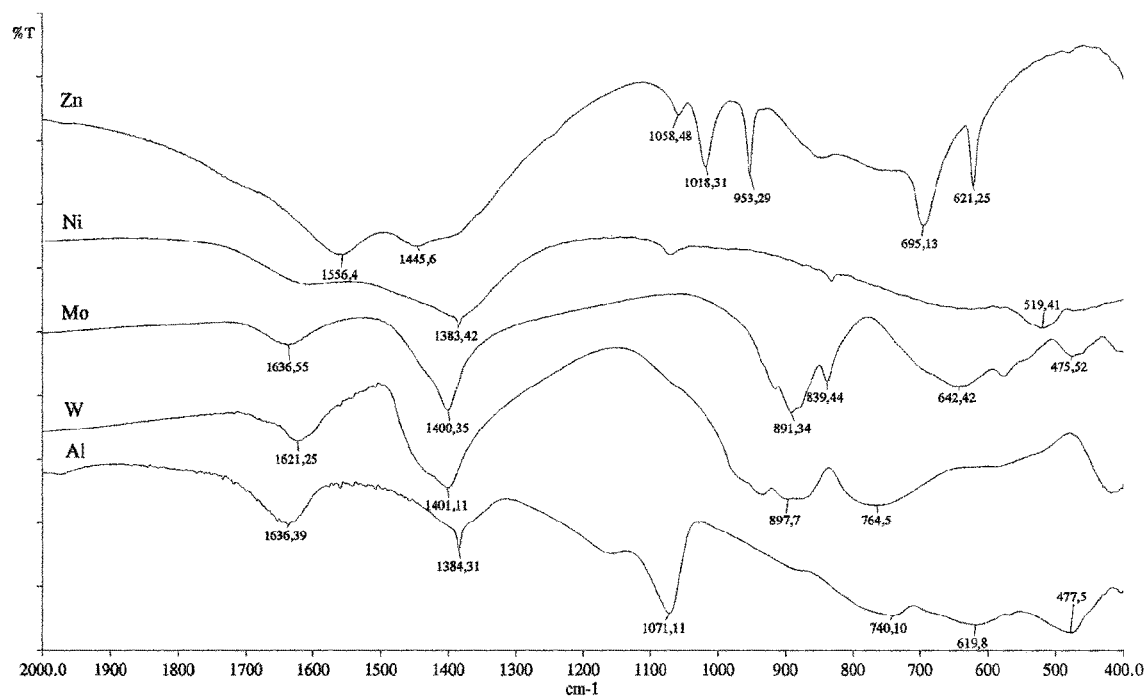
FIG. 3b shows the FT-IR spectra of selected precursors of metals used in the preparation of the above-mentioned mixed oxide.

By comparison, the FT-IR spectra of selected precursors of the metals used in the preparation of the above-mentioned mixed oxide are reported in FIG. 3b.

The main signals FT-IR present in the solid after drying are attributable to precursors of metals usable in the synthesis: in particular the signal at about 1400 cm$^{-1}$ is typical of the precursors of Mo, W, Ni and the signal at about 1070 cm$^{-1}$ is typical of the Al precursor (pseudo-boehmite).

In the calcinated materials this signals are no longer present, thus indicating a reaction at the solid state between the metal components associated to the formation of a mixed oxide. In particular, in FIG. 3a (600° C.) is no longer detectable the typical signal of alumina at about 1070 cm$^{-1}$, thus indicating that it is not present as such, in mixture with a mixed oxide of Zn, Ni, Mo and W. In other words, in the mixed oxides of formula (I) obtained through the process according to the invention, the aluminum added as soluble, hydrolysable or dispersible source of aluminum has not the function of support or binder, and then of dilution, for the other metal components, but is in the composition of the mixed oxide in an equal manner with respect to the other metals. In particular, the mixed oxide of formula (I), independently from the fact that it comprises or it does not comprise the metal Me, produces a FT-IR spectrum wherein the signals at 805±10 cm$^{-1}$, 605±10 cm$^{-1}$ and 445±10 cm$^{-1}$, which are typical of the Wolframite phase and whose definition increases with the calcination temperature, are recognized.

The surface area and the porosity of the mixed oxide of formula (I) obtained through the process of the present invention were determined from the isotherm of absorption/desorption of $N_2$ at the temperature of −196° C., by using the Micrometrics TriStar® Surface Area and Porosity Analyzer. Before acquiring the isotherms, samples (about 0.3 g per test) were subjected to pre-treatment under-vacuum for 16 hours at 150° C.

The Specific Surface Area (SSA) was determined by the BET method (Brunauer-Emmett-Taller), known to the skilled person, carrying out the analysis in the range of relative pressure of P/P o comprised between 0.05 and 0.3.

The above-mentioned mixed-oxide is characterized by having a specific Surface Area, determined after heat treatment at 350° C., higher than or equal to 80 m$^2$/g. Preferably, the Specific Surface Area is comprised in the range 90-230 m²/g and more preferably it is comprised in the range 90-190 m²/g.

The mixed oxide of formula (I) obtained by the process according to the invention is mesoporous, namely, in accordance with the IUPAC terminology (Pure & Appl. Chem. Vol. 66, No. 8, pp. 1739-1758, 1994), is characterized by pore diameter comprised between 2 and 50 nm. Preferably the average pore diameter ranges from 4 to 10 nm.

The specific total volume of the pores was calculated by using the Gurvitsch method at 0.99 P/P o and the pore distribution was determined by applying the BJH (Barret-Joyner-Hallender) method on the desorption curve. All the cited methods are known to one skilled in the art.

The mixed oxide of formula (I) obtained by the process of the present invention is characterized by a volume of the pores higher than or equal 0.15 mL/g. Preferably said volume of the pores is comprised between 0.15 and 0.35 mL/g.

The mixed oxide of formula (I), possibly bound to at least one inorganic binder B, obtained by the process of the present invention can be transformed in the corresponding sulphide, and said sulphide can be advantageously used as hydrotreatment catalyst.

Therefore, it is a further object of the present invention a metal sulphide catalyst obtained by sulphidation of the mixed oxide of formula (I), possibly bound to at least one inorganic binder B.

In a preferred aspect, the mixed oxide of formula (I) subjected to sulphidation in order to provide the above-mentioned metal sulphide catalyst, is obtained by the process of preparation of said mixed oxide of formula (I), according to the invention.

According to a different embodiment of the invention, the metal sulphidated catalyst can be obtained by sulphidation of the mixed oxide of formula (I) bound to at least one inorganic binder B.

In a preferred aspect, the mixed oxide of formula (I) bound to at least one inorganic binder B subjected to sulphidation to provide the above-mentioned metal sulphide catalyst, is obtained by the process of preparation of said mixed oxide of formula (I) bound to at least one inorganic binder B, according to the invention.

In order to obtained the corresponding sulphidated composition active as hydrotreatment catalyst, the mixed oxide sulphidation of the present invention can be carried out by any one of the techniques known to the skilled person, by using any sulphiding agent, as described, for example, by J. H. Gary e G. E. Handwerk in "Petroleum Refining-Technology and Economics" (2001, M. Dekker) p. 177.

The sulphidation can be carried out in situ, namely in the same reactor wherein the hydrotreatment will be subsequently carried out, or ex situ. The sulphidation process can be carried out under reducing atmosphere, for example constituted by $H_2S$ and $H_2$, or with $CS_2$ and $H_2$, at high temperature, preferably with $H_2S$ and $H_2$, at a temperature comprised between 300° C. and 500° C., for a period sufficient to sulphidate the starting mixed oxide. For example, the sulphidation can be carried out for a time comprised between 1 and 100 hours and preferably it is carried out for a time comprised between 15 and 50 hours.

Alternatively, the sulphidation of the mixed oxides can be carried out by using dimethyldisulphide (DMDS) dissolved in a hydrocarbon charge such as, for example, naphtha or gas-oil, at temperatures comprised between 300° C. and 500° C.

Finally, in a further preferred aspect, the sulphidation can be carried out contacting the mixed oxide of the present invention directly with the sulphur-rich hydrocarbon charge to be treated, preferably at temperatures comprised between 300° C. and 500° C.

As above-mentioned, the catalyst of the present invention obtained by the sulphidation of the mixed oxide of formula (I) or the mixed oxide of formula (I) bound to at least one inorganic binder B, is a catalyst which is very active and stable, and it provides particularly high and wide-spectrum catalytic performances in the hydrotreatment process, comprising, in addition to hydrodesulphurization and hydrodenitrogenation, also the hydrodearomatization and the reduction of the content of polycyclic aromatic hydrocarbons in the treated hydrocarbon mixtures.

Conversely, the above-mentioned catalyst shows a poor tendency to catalyze hydrocracking reactions.

Therefore, it is a further object of the present invention, a hydrotreating process of a feeding containing one or more hydrocarbons comprising contacting said feeding with hydrogen in the presence of a catalyst obtained by the sulphidation of the mixed oxide of formula (I) or the mixed oxide of formula (I) bound to at least one inorganic binder B.

Any feeding of hydrocarbon mixture containing impurities comprising sulphur and/or nitrogen can be treated with the catalyst of the present invention: for example, crude-oil distillates, crude oil residues, naphtha, etcetera, can be subjecting to the treatment, and preferably the hydrotreatment relates to hydrocarbon cuts containing contaminants comprising sulphur and/or contaminants comprising nitrogen.

Particularly, the metal sulphide catalyst of the present invention can be advantageously used for hydrotreating feedings comprising one or more hydrocarbons containing up to 4% w/w of S, up to 0.2% w/w of N and up to 50% w/w of polynuclear aromatic hydrocarbons.

Preferably the processing occurs at a temperature comprised between 100 and 450° C., more preferably between 300 and 370° C., at a pressure comprising between 5.0 and 10.0 MPa, more preferably between 5.0 and 7.0 MPa. The space velocity LHSV (Liquid Hour Space Velocity) can be comprised between 0.5 e 5 $h^{-1}$, preferably between 0.8 and 2 $h^{-1}$. The hydrogen amount can range between 100 and 800 times the hydrocarbon amounts, expressed as $N1H_2/1$ of hydrocarbon mixture.

In view of its capability to simultaneously carry out a high activity of hydrodesulphurization, hydrodenitrogenation, hydrodearomatization and reduction of the polynuclear aromatic compounds, the catalyst of the invention can be advantageously used also as hydrogenating component, associated to an acid components, in the hydrocracking process. Feeding suitable of hydrocracking, are, for example, heavy and extra-heavy crude oil, Vacuum Gas Oil (VGO), Vacuum Residues (VR).

In order to put into practice and better illustrate the present invention, some non-limiting examples, wherein the processes of preparation of mixed oxides of formula (I) which are precursors of the catalysts and the catalytic test, are reported below.

In all the examples, the composition molar formulas of the mixed oxide are normalized with respect to the sum (Ni moles+Zn moles)=1.00.

Example 1 according to the invention (preparation of a mixed oxide having the composition: $Me_{0.00}Ni_{1.00}Mo_{0.60}W0.40Al_{1.04}O_{5.56}$'6.0% C)

The preparation procedure of the mixed oxide involves the subsequent addition under suitable temperature conditions and stirring of solutions or dispersions containing the elements of the composition.

Firstly, 49.4 g of ammonium metatungstate hydrate $(NH_4)_6 H_2W_{12}O_{40} \cdot xH_2O$ were added to 154 g of water and the salt dissolution was promoted by using a rod-stirrer set at 180 rpm (peripheral speed=40 m/min). After about 15 minutes, 51.9 g of ammonium heptamolybdate $(NH_4)_6 Mo_7O_{24} \cdot 4H_2O$ were added to the solution and the mixture was heated at 50° C. under stirring in order to facilitate the dissolution of the molybdenum salt. 62.7 g of nickel hydroxycarbonate $NiCO_3 \cdot Ni(OH)_2 \cdot 4H_2O$ (58% by weight of NiO) were added after 30 minutes, bringing the mixture temperature to 70° C., and the same mixture was maintained at this temperature always under constant stirring for at least 30 minutes.

In the meantime, 36.7 g of Disperal® P3 Sasol (pseudo-boehmite containing $Al_2O_3$ 70% w/w) were mixed with 188.1 g of an aqueous solution of acetic acid 0.6% w/w. The mixture was maintained under stirring for about 2 hours, in order to obtain a homogeneous alumina dispersion.

Simultaneously, 4.7 g of methylcellulose Methocel® MC Fluka were added to 35.0 g of water at the temperature of 50° C. The mixture was maintained at 50° C. under stirring for about 10 minutes in order to obtain a homogeneous dispersion of the polymer organic compounds.

This latter was slowly added to the alumina dispersion, under stirring and maintaining the temperature at 50° C. until obtaining a homogeneous dispersion containing both alumina and the polymer organic compound.

Said homogeneous dispersion was added to the suspension containing Ni, Mo and W above described, maintained in turn at 70° C. under stirring. The addition is carried out very slowly and using a dropping funnel. At the end, the temperature of the mixture was brought to 90° C. and the obtained suspension was maintained at such temperature under stirring for about 18 hours. The pH of the suspension measured at the end of the above-mentioned heat treatment was equal to 5.6, and the content of Methocel® MC was equal to 3.1% by weight with respect to the theoretical content of mixed oxide.

At the end of this treatment, the dispersion thus obtained, which has a theoretical content of oxides equal to 26% by weight, was cooled and subjected to drying for about 20 minutes in a pre-heated oven at 200° C. Part of the obtained solid (50g) was calcinated in static air according to the following programmed temperature: from room temperature at 200° C. in 30 minutes with a ramp of 6° C./min, isotherm at 200° C. for 10 minutes, heating up to 350° C. in 2 hours and 35 minutes with a ramp of about 1° C./min, isotherm at 350° C. for 5 hours.

The 27 Al MAS NMR spectrum is reported in FIG. 1a, from which it can be calculated that 99 mol % of aluminum occupy an octahedral coordination.

A part of the sample calcinated at 350° C. was further calcinated at 600° C. for 5 hours. The XRD spectra of the samples subjected to several heat treatments are reported in FIG. 2a.

The remaining part of the sample dried at 200° C. was then placed into a mechanical mixer and mixed at a temperature of about 50° C. for about 2 hours, until obtaining an homogeneous paste with a suitable consistency to be extruded. The extrudate was aged at room temperature for 15 hours, then calcinated with the ramp described above.

The final mixed oxide extruded has the following molar composition: $Ni_{1.00}Mo_{0.60}W_{0.40}Al_{1.04}O_{5.56}$. The mixed oxide contains 6.0% by weight of organic component residue with respect to the total weight of the solid.

The Specific Surface Area (SSA) is 142 m²/g, the total volume of the pores (Vp) is 0.18 cm³/g, the average pore size is 4.0 nm calculated from the desorption isotherm.

Example 2 according to the invention (preparation of a mixed oxide having the composition: $Me_{0.00}Ni_{1.00}Mo_{0.50}W_{0.50}Al_{1.04}O_{5.56}$ 6.3% C)

The procedure of example 1 was repeated by modifying the amounts of ammonium metatungstate hydrate $(NH_4)_6 H_2W_{12}O_{40} \cdot xH_2O$ (61.7 g) and of ammonium heptamolybdate $(NH_4)_6Mo_7O_{24} \cdot 4H_2O$ (43.2g).

The obtained mixed oxide has the following molar composition: $Ni_{1.00}Mo_{0.50}W_{0.50}Al_{1.04}O_{5.56}$. The mixed oxide contains 6.3% by weight of organic component residue with respect to the total weight of the solid. The Specific Surface Area (SSA) is 149 m²/g, the total volume of the pores (Vp) is 0.19 cm³/g, the average pore diameter is 4.4 nm calculated from the desorption isotherm.

Example 3 according to the invention (preparation of a mixed oxide having the composition: $Me_{0.50}Ni_{0.50}Mo_{0.50}W_{0.50}Al_{1.02}O_{5.53}$.13.1% C wherein Me=Zn)

61.7 g of ammonium metatungstate hydrate $(NH_4)_6 H_2W_{12}O_{40} \cdot xH_2O$ were added to 154 g of water and the salt dissolution was promoted by using a rod-stirrer set at 180 rpm (peripheral speed=40 m/min). After about 15 minutes, 43.2 g of ammonium heptamolybdate $(NH_4)_6Mo_7O_{24} \cdot 4H_2O$ were added to the solution and the mixture was heated at 50° C. under stirring in order to facilitate the dissolution of the molybdenum salt. 53.9 g of Zn acetate $Zn(CH_3COO)_2 \cdot 2H_2O$ were added after 30 minutes, then the mixture was maintained at 50° C. and under stirring for other 30 minutes. Finally, 31.7 g of nickel hydroxycarbonate $NiCO_3 \cdot Ni(OH)_2 \cdot 4H_2O$ (58% by weight of NiO) were added, the mixture temperature was brought to 70° C., and the same mixture was maintained at this temperature always under constant stirring for at least 30 minutes.

In the meantime, 36.7 g of Disperal® P3 Sasol (pseudo-boehmite containing $Al_2O_3$ 70% w/w) were mixed with 188.1 g of an aqueous solution of acetic acid 0.6% w/w. The mixture was maintained under stirring for about 2 hours, in order to obtain a homogeneous alumina dispersion.

Simultaneously, 4.2 g of methylcellulose Methocel® MC Fluka were added to 35.0 g of water at the temperature of 50° C. The mixture was maintained at 50° C. under stirring for about 10 minutes in order to obtain a homogeneous dispersion of the polymer organic compound.

This latter was slowly added to the alumina dispersion, under stirring and maintaining the temperature at 50° C. until obtaining a homogeneous dispersion containing both alumina and the polymer organic compound.

Said homogeneous dispersion was added to the suspension containing Zn, Ni, Mo and W above described, maintained in turn at 70° C. under stirring. The addition is carried out very slowly and using a dropping funnel. At the end, the temperature of the mixture was brought to 90° C. and the obtained slurry was maintained at such temperature under stirring for about 18 hours. The pH of the suspension measured at the end of the above-mentioned heat treatment was equal to 5.6, and the content of Methocel® MC was equal to 3.1% by weight with respect to the theoretical content of mixed oxide.

At the end of this treatment, the dispersion thus obtained, which has a theoretical content of oxides equal to 22% by weight, with respect to the total weight of the dispersion, was cooled and subjected to drying for about 20 minutes in a pre-heated oven at 200° C.

The recovered solid phase was then calcinated in static air according to the following temperature program: from room temperature at 200° C. in 30 minutes with a ramp of 6° C./min, isotherm at 200° C. for 10 minutes, heating up to 350° C. in 2 hours and 35 minutes with a ramp of about 1° C./min, isotherm at 350° C. for 5 hours.

The final mixed oxide has the following molar composition: $Zn_{0.50}Ni_{0.50}Mo_{0.50}W0.50Al_{1.02}O_{5.53}$. The mixed oxide contains 13.1% by weight of organic component residue with respect to the total weight of the solid.

The Specific Surface Area (SSA) is 142 m$^2$/g, the total volume of the pores (Vp) is 0.21 cm$^3$/g, the average pore size is 9 nm calculated from the desorption isotherm.

Example 4 according to the invention (preparation of a mixed oxide having the composition: $Me_{0.25}Ni_{0.75}Mo_{0.60}W_{0.40}Al_{1.03}O_{5.55}$·14.9% C, wherein Me=Zn)

49.4 g of ammonium metatungstate hydrate $(NH_4)_6H_2W_{12}O_{40}\cdot xH_2O$ were added to 154 g of water and the salt dissolution was promoted by using a rod-stirrer set at 180 rpm (peripheral speed=40 m/min). After about 15 minutes, 51.9 g of ammonium heptamolybdate $(NH_4)_6Mo_7O_{24}\cdot 4H_2O$ were added to the solution and the mixture was heated at 50° C. under stirring in order to facilitate the dissolution of the molybdenum salts. 27.2 g of Zn acetate $Zn(CH_3COO)_2\cdot 2H_2O$ were added after 30 minutes, then the mixture was maintained at 50° C. and under stirring for other 30 minutes. Finally, 47.0 g of nickel hydroxycarbonate $NiCO_3\cdot Ni(OH)_2\cdot 4H_2O$ (58% by weight of NiO) were added, the mixture temperature was brought to 70° C., and the mixture was maintained to this temperature always under constant stirring for at least 30 minutes.

In the meantime, 36.7 g of Disperal® P3 Sasol (pseudo-boehmite containing $Al_2O_3$ 70% w/w) were mixed with 188.1 g of an aqueous solution of acetic acid 0.6% w/w. The mixture was maintained under stirring for about 2 hours, in order to obtain a homogeneous alumina dispersion.

Simultaneously, 4.4 g of methylcellulose Methocel® MC Fluka were added to 35.0 g of water at the temperature of 50° C. The mixture was maintained at 50° C. under stirring for about 10 minutes in order to obtain a homogeneous dispersion of the polymer organic compounds.

This latter was slowly added to the alumina dispersion, under stirring and maintaining the temperature at 50° C. until obtaining a homogeneous dispersion containing both alumina and the polymer organic compound.

Said homogeneous dispersion was added to the suspension containing Zn, Ni, Mo and W above described, maintained in turn at 70° C. under stirring. The addition is carried out very slowly and using a dropping funnel. At the end, the temperature of the mixture was brought to 90° C. and the obtained slurry was maintained at such temperature under stirring for about 18 hours. The pH of the suspension measured at the end of the above-mentioned heat treatment was equal to 5.6, and the content of Methocel® MC was equal to 3.1% by weight with respect to the theoretical content of mixed oxide.

At the end of this treatment, the dispersion thus obtained, which has a theoretical content of oxides equal to 24% by weight, was cooled and subjected to drying for about 20 minutes in a pre-heated oven at 200° C.

The recovered solid phase was then calcinated in static air according to the following temperature program: from room temperature at 200° C. in 30 minutes with a ramp of 6° C./min, isotherm at 200° C. for 10 minutes, heating up to 350° C. in 2 hours and 35 minutes with a ramp of about 1° C./min, isotherm at 350° C. for 5 hours.

The final mixed oxide has the following molar composition: $Me_{0.25}Ni_{0.75}Mo_{0.60}W_{0.40}Al_{1.03}O_{5.55}$. The mixed oxide contains 14.9% by weight of organic component residue with respect to the total weight of the solid.

The Specific Surface Area (SSA) is 175 m$^2$/g, the total volume of the pores (Vp) is 0.21 cm$^3$/g, the average pore size is 4.1 nm calculated from the desorption isotherm.

A part of the sample was further calcinated at 600° C. for 5 hours. The XRD spectra of the samples subjected to several heat treatments are reported in FIG. 2b. From the X-rays diffraction spectra at 120° C., 350-400° C. and 600° C. it was observed that at least three signals are always present in the range comprised between 25° and 28° of the 2θ angle.

The FT-IR spectra of the samples subjected to several heat treatments are reported in FIG. 3a.

Example 5 according to the invention (preparation of a mixed oxide having the composition: $Me_{0.25}Ni_{0.75}Mo_{0.60}W_{0.40}Al_{1.03}O_{5.55}$·13.8% C·10% γ-$Al_2O_3$ wherein Me=Zn and bound to 10% of inorganic binder B)

This example discloses the preparation of a mixed oxide containing Zn and bound to an inorganic binder B, wherein the polymer organic compound used is Methocel® MC.

The process followed is identical to that described in previous example 4, with the difference that 58.0 g of dispersible γ-alumina (AERODISP® W925, γ-$Al_2O_3$ 25% w/w) were added to the mixture before the final heat treatment of 18 hours.

The final mixed oxide has the following molar composition: $Zn_{0.25}Ni_{0.75}Mo_{0.6}W_{0.4}Al_1O_{5.5}$·10% γ-$Al_2O_3$. The mixed oxide contains 13.8% by weight of organic component residue with respect to the total weight of the solid.

The Specific Surface Area (SSA) is 145 m$^2$/g, the total volume of the pores is 0.23 cm$^3$/g, the average pore size is 4.0 nm calculated from the desorption isotherm.

The X-ray diffraction spectrum of the obtained mixed oxide allows to detect at least three signals in the range of the 2θ angle comprised between 21° and 28°.

The $^{27}$Al-MAS-NMR spectrum is reported in FIG. 1b, from which it was calculated that 81 mol % of aluminum occupy an octahedral coordination.

Example 6 comparative (preparation of a mixed oxide having the composition:$Ni_{1.0}Mo_{0.5}W_{0.54}Al_{0.57}O_{4.98}$·2.0% C, not according to the invention) 7.56 g of octylamine were dissolved in 40 g of absolute ethanol. A solution containing 14.89 g of nickel hexahydrate nitrate $Ni(NO_3)_2\cdot 6H_2O$, 4.52 g of ammonium heptamolybdate $(NH_4)_6Mo_7O_{24}\cdot 4H_2O$ and 6.98 g of ammonium metatungstate hydrate $(NH_4)_6H_2W_{12}O_{40}\cdot xH_2O$ dissolved in 50 ml of an aqueous sol containing 14.90 g of an aqueous dispersion of boehmite (Disperal® P2 by Sasol™) 10% by weight was added under stirring to this solution. The octylamine/(Ni+Mo+W) molar ratio is equal to 0.6. A light green gel, which was left under stirring for 3 hours, heating at 70° C., was formed. It was left to stand for 48 hour. The gel obtained did not have supernatant and it was dried into a oven at 90° C. for 48 hours. The dried material was subjected to heat treatment at 400° C. for 5 hours in air The solid had the following molar composition $Ni_{1.00}Mo_{0.50}W_{0.54}Al_{0.57}O_{4.98}$. The mixed oxide contains 2.0% by weight of organic component residue with respect to the total weight of the solid.

The specific surface area is 151 m²/g, the total volume of the pores 0.381 cm³/g, the average diameter of the pores 6.3 nm, calculated from the desorption isotherm.

Example 7 (catalytic test)

The mixed oxides prepared according to the examples 1,2,4,5,6 were used in experiments wherein their effectiveness as hydrotreatment catalysts was verified.

In each experiment, 20 cm³ of mixed oxide, preventively pressed, granulated and sieved (10-16 meshes), were diluted with 20 cm³ of inert material (carborundum) and loaded into a fixed-bed reactor of volume equal to 40 ml. Then, the mixed oxide was treated with a sulphiding mixture, consisting of "Straight Run Gasoil" added with dimethyldisulphide (DMDS), so as to have a concentration of S equal to 2.5% by weight with respect to the total weight of the sulphide mixture. The used sulphidation conditions were:

LHVS=3 h⁻¹
P=3.0 MPa
T=340° C.
H₂/sulphide mixture=200 NL/L
Sulphidation time=26 h To the sulphidation phase, in which the mixed oxide acquires the catalytic properties, a stabilization phase followed at T=330° C. for 60-100 h, maintaining the catalytic bed into contact with the "Straight Run" gas-oil.

The hydrotreatment reaction was carried out by feeding a mixture consisting of "Straight Run" gas-oil and "Visbreaking" in proportion 75:25 (w/w) and therefore characterized by high amounts of sulphur (2% w/w) and polynuclear aromatic hydrocarbons (17% w/w).

The reaction conditions were as follows:

P(H₂)=4.9 MPa
H₂/feed ratio=230 NL/L
LHSV=0.8 h⁻¹
Reaction temperature=340° C.

The activity of each catalyst was assessed in percentage with respect to the catalyst activity of the comparative example 6 (set to 100%).

Data are reported in the following Table 4.

TABLE 4

| Catalyst | Composition | HDS | HDN | HDA |
|---|---|---|---|---|
| Example 1 | $Ni_{1.00}Mo_{0.60}W_{0.40}Al_{1.04}O_{5.56} \bullet 6.0\%$ C | 100.1 | 100.1 | 253.8 |
| Example 2 | $Ni_{1.00}Mo_{0.50}W_{0.50}Al_{1.04}O_{5.56} \bullet 6.3\%$ C | 100.3 | 100.3 | 341.8 |
| Example 4 | $Zn_{0.25}Ni_{0.75}Mo_{0.60}W_{0.40}Al_{1.03}O_{5.55} \bullet 14.9\%$ C | 100.3 | 100.4 | 303.3 |
| Example 5 | $Zn_{0.25}Ni_{0.75}Mo_{0.60}W_{0.40}Al_{1.03}O_{5.55} \bullet 13.8\%$ C$\bullet$10% $\gamma$-$Al_2O_3$ | 100.1 | 100.3 | 224.2 |
| Example 6 comparative | $Ni_{1.0}Mo_{0.5}W_{0.54}Al_{0.57}O_{4.98} \bullet 2.0\%$ C | 100.0 | 100.0 | 100.0 |

Besides comparable performances of hydrodesulphurization (HDS) and hydrodenitrogenation (HDN), all the samples showed a significant increase of conversion in the hydrodearomatization (HDA).

It is important to note that also the catalyst of example 5, characterized by a lower content of metals, as it contains 10% by weight of inorganic binder B, is more active, mainly for the aims of the hydrodearomatization reaction, with respect to the catalyst of the comparative example.

The invention claimed is:

1. A metal sulfide catalyst, obtained by sulfiding a mixed oxide of formula (I) or of the mixed oxide of formula (I) bound to at least one inorganic binder B:

$$Me_aNi_bMo_cW_dAl_eO_f \bullet pC \quad (I),$$

wherein
Me is Zn, Cd, Mn, or a mixture thereof,
C comprises a polymer organic compound,
a is 0 or higher,
b, c, d, e and f are higher than 0,
f is (2a+2b+6c+6d+3e)/2,
(a+b)/(c+d) is in a range of from 0.9 to 1.1,
a/b is in a range of from 0 to 1.5,
c/d is in a range of from 0.2 to 5,
(a+b+c+d)/e is in a range of from 0.6 to 5, and
p is a weight percentage of the polymer organic compound C and optionally a residue of the polymer organic compound C, with respect to a total weight of the mixed oxide of formula (I), p being in a range of from 0.2 to 40%,
wherein the mixed oxide of formula (I) comprises an amorphous phase and a pseudo-crystalline phase isostructural to wolframite.

2. A process for obtaining a mixed oxide or, optionally, a metal sulfide via the mixed oxide, the process comprising:
(1) mixing at least one soluble source of W and at least one soluble source of Mo into a volume of water, until a clear aqueous solution is obtained;
(2) optionally, adding at least one source of at least one element Me to the clear aqueous solution obtained in the mixing (1), to obtain a first mixture;
(3) adding at least one source of Ni to the first mixture obtained in the adding (2) or the clear aqueous solution obtained in the mixing (1), to obtain a second mixture;
(4) heat treating the second mixture obtained in the adding (3), at a temperature in a range of from 50 to 80° C., under stirring, to obtain a third mixture;
(5) adding to the third mixture obtained in the heat treating (4), at least one source of Al that is soluble, hydrolyzable, or dispersible, and at least one polymer organic compound, to obtain a fourth mixture;
(6) heat treating the fourth mixture obtained in the adding (5), at a temperature in a range of from 80 to 95° C., under stirring, to obtain a suspension;
(7) drying the suspension obtained in the heat treating (6), to obtain a solid phase; and
(8) calcining the solid phase obtained in the drying (7), to obtain the mixed oxide, and optionally further processing, to obtain the metal sulfide, wherein the mixed oxide is of formula (I):

$$Me_aNi_bMo_cW_dAl_eO_f \bullet pC \quad (I),$$

wherein
Me is Zn, Cd, Mn, or a mixture thereof,
C comprises a polymer organic compound,
a is 0 or higher,
b, c, d, e and f are higher than 0,
f is (2a+2b+6c+6d+3e)/2,
(a+b)/(c+d) is in a range of from 0.9 to 1.1,
a/b is in a range of from 0 to 1.5, the c/d is in a range of from 0.2 to 5, (a+b+c+d)/e is in a range of from 0.6 to 5, and p is a weight percentage of the polymer organic compound C and optionally a residue of the polymer organic compound C, with respect to a total weight of the mixed oxide of formula (I), p being in a range of from 0.2 to 40%, wherein the mixed oxide of formula (I) comprises an amorphous phase and a pseudo-crystalline phase isostructural to wolframite.

3. The process of claim 2, comprising the adding (2), wherein the at least one element Me is Zn.

4. The process of claim 2, comprising the adding (2), wherein the at least one element Me is Mn.

5. The process of claim 2, wherein the adding (2) is omitted.

6. The process of claim 2, wherein the heat treating (4) is carried out for a time period in a range of from 10 minutes to 1 hour.

7. The process of claim 2, wherein the source of aluminum in the adding (5) is a dispersible alumina.

8. The process of claim 2, wherein the polymer organic compound added in the adding (5) is methylcellulose.

9. The process of claim 2, comprising, in the adding (5):

adding a dispersion, which is separately prepared and comprises both the at least one source of Al and the at least one polymer organic compound.

10. The process of claim 2, wherein the heat treating (6) is carried out for a time period in a range of from 5 to 30 hours.

11. The process of claim 2, further comprising, immediately after the drying (7) and prior to the calcining (8):

(7') shaping the dried solid phase.

12. The process of claim 2, wherein the calcining (8) is carried out under inert or air atmosphere, at a temperature in a range of from 200 to 450° C.

13. The process of claim 2, wherein p in the mixed oxide is in a range of from 0.01 to 30%.

14. The process of claim 2, further comprising, immediately after the adding (5) and before the heat treating (6):

(5') adding an inorganic binder B.

15. The process of claim 2, wherein the further processing comprises sulfiding the mixed oxide of formula (I).

16. The process of claim 14, wherein the further processing comprises sulfiding the mixed oxide of formula (I) bound to at least one inorganic binder B.

17. The process of claim 2, wherein a in the mixed oxide of formula (I) is higher than 0, and Me comprises Mn.

18. The process of claim 2, wherein a in the mixed oxide of formula (I) is higher than 0, and Me comprises at least two of Zn, Cd, and Mn.

19. The process of claim 2, wherein a/b in the mixed oxide of formula (I) is in a range of from 0.1 to 0.4.

20. The process of claim 2, wherein c/d in the mixed oxide of formula (I) is in a range of from 1 to 2.5.

* * * * *